United States Patent
Huang et al.

(10) Patent No.: US 9,306,447 B2
(45) Date of Patent: Apr. 5, 2016

(54) POWER SUPPLY APPARATUS WITH VARIABLE CIRCUIT LOOP IMPEDANCE

(71) Applicant: Chicony Power Technology Co., Ltd., New Taipei (TW)

(72) Inventors: Wen-Nan Huang, New Taipei (TW); Shiu-Hui Lee, New Taipei (TW); Yao-Wen Tsai, New Taipei (TW); Ching-Guo Chen, New Taipei (TW); Meng-Hsuan Tsai, Chiayi (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 14/304,544

(22) Filed: Jun. 13, 2014

(65) Prior Publication Data

US 2015/0180363 A1 Jun. 25, 2015

(30) Foreign Application Priority Data

Dec. 20, 2013 (TW) .............................. 102224172 U

(51) Int. Cl.
| | |
|---|---|
| H02M 7/15 | (2006.01) |
| H02M 1/42 | (2007.01) |
| H02M 1/36 | (2007.01) |
| H02M 7/12 | (2006.01) |
| H02M 1/00 | (2007.01) |

(52) U.S. Cl.
CPC .............. *H02M 1/4208* (2013.01); *H02M 1/36* (2013.01); *H02M 7/125* (2013.01); *H02M 2001/0048* (2013.01)

(58) Field of Classification Search
CPC ..... H02M 1/36; H02M 1/4208; H02M 7/125; H02M 2001/0048

USPC ....................................................... 363/52, 89
See application file for complete search history.

(56) References Cited

U.S. PATENT DOCUMENTS 4,222,096 A * 9/1980 Capewell ........................ 363/44
6,388,902 B1 * 5/2002 Yasumura ........... H02M 3/3385
363/21.02

(Continued)

FOREIGN PATENT DOCUMENTS

| JP | 05-074192 | 3/1993 |
|---|---|---|
| JP | H 05-122939 | 5/1993 |

(Continued)

OTHER PUBLICATIONS

JP Office Action dated Jan. 6, 2015.

*Primary Examiner* — Jessica Han
*Assistant Examiner* — Lorena Bruner
(74) *Attorney, Agent, or Firm* — Muncy, Geissler, Olds & Lowe, P.C.

(57) ABSTRACT

When a power conversion unit is in a working mode, the power conversion unit converts an alternating current power from an alternating current power supply apparatus into a direct current power. Then, the power conversion unit sends a power starting signal to a first switch control unit. After the first switch control unit receives the power starting signal, the first switch control unit turns on a first switch unit, so that an overall capacitor impedance formed by a first capacitor and a second capacitor is smaller than a first capacitor impedance formed by the first capacitor. When the power conversion unit is not in the working mode, the first switch control unit turns off the first switch unit, so that the overall capacitor impedance is equal to the first capacitor impedance.

8 Claims, 2 Drawing Sheets

(56) References Cited

U.S. PATENT DOCUMENTS

| | | | | |
|---|---|---|---|---|
| 6,456,511 B1* | 9/2002 | Wong | ............ | H02M 1/36 363/21.13 |
| 2003/0053322 A1* | 3/2003 | Chiu | ............ | H02M 7/217 363/89 |
| 2003/0142513 A1* | 7/2003 | Vinciarelli | ............ | 363/17 |
| 2008/0084718 A1* | 4/2008 | Ingman | ............ | H02M 7/125 363/53 |
| 2012/0223590 A1* | 9/2012 | Low | ............ | H02J 5/005 307/104 |
| 2014/0009970 A1* | 1/2014 | Brinlee | ............ | H02M 3/156 363/21.01 |

FOREIGN PATENT DOCUMENTS

| | | |
|---|---|---|
| JP | H 11-289766 | 10/1999 |
| JP | 2012-10434 | 1/2012 |

\* cited by examiner

POWER SUPPLY APPARATUS WITH VARIABLE CIRCUIT LOOP IMPEDANCE

BACKGROUND OF THE INVENTION

1. Field of the Invention

The present invention relates to a power supply apparatus, and especially relates to a power supply apparatus with variable circuit loop impedance.

2. Description of the Related Art

The inrush current is generated easily when a power supply (or a power conversion apparatus) is just started or a load is just connected to the power supply (or the power conversion apparatus). The power supply (or the power conversion apparatus) is broken easily by the inrush current. Therefore, the power supply (or the power conversion apparatus) usually includes a negative temperature coefficient thermistor for suppressing the inrush current.

However, the resistance of the negative temperature coefficient thermistor is high. The energy of the power supply (or the power conversion apparatus) is wasted when the power supply (or the power conversion apparatus) is in a working mode (no inrush current risk).

SUMMARY OF THE INVENTION

In order to solve the above-mentioned problems, an object of the present invention is to provide a power supply apparatus with variable circuit loop impedance.

In order to achieve the object of the present invention mentioned above, the power supply apparatus with variable circuit loop impedance is applied to an alternating current power supply apparatus and a load apparatus. The power supply apparatus includes a power conversion unit, a first capacitor, a second capacitor, a first switch unit and a first switch control unit. The power conversion unit is electrically connected to the alternating current power supply apparatus and the load apparatus. The first capacitor is electrically connected to the power conversion unit. The second capacitor is electrically connected to the power conversion unit and the first capacitor. The first switch unit is electrically connected to the second capacitor. The first switch control unit is electrically connected to the first switch unit, the power conversion unit and the alternating current power supply apparatus. When the power conversion unit is in a working mode, the power conversion unit converts an alternating current power from the alternating current power supply apparatus into a direct current power. Then, the power conversion unit sends a power starting signal to the first switch control unit. After the first switch control unit receives the power starting signal, the first switch control unit turns on the first switch unit, so that an overall capacitor impedance formed by the first capacitor and the second capacitor is smaller than a first capacitor impedance formed by the first capacitor. When the power conversion unit is not in the working mode, the first switch control unit turns off the first switch unit, so that the overall capacitor impedance is equal to the first capacitor impedance.

Moreover, the power supply apparatus further includes a protective resistor electrically connected to the first switch unit and the second capacitor.

Moreover, the power conversion unit includes a direct current to direct current conversion subunit electrically connected to the load apparatus, the first switch control unit, the first capacitor and the second capacitor. The direct current to direct current conversion subunit sends the power starting signal to the first switch control unit when the power conversion unit is in the working mode.

Moreover, the power conversion unit further includes a power factor correction subunit electrically connected to the first capacitor, the second capacitor and the direct current to direct current conversion subunit.

Moreover, the power conversion unit further includes a negative temperature coefficient thermistor electrically connected to the power factor correction subunit and the first switch control unit.

Moreover, the power conversion unit further includes a rectifying subunit electrically connected to the alternating current power supply apparatus, the negative temperature coefficient thermistor and the first switch control unit.

Moreover, the first switch unit is, for example but not limited to, a transistor switch. The direct current to direct current conversion subunit is, for example but not limited to, a direct current to direct current converter. The power factor correction subunit is, for example but not limited to, a power factor correction circuit. The rectifying subunit is, for example but not limited to, a bridge rectifier.

The efficiency of the present invention is to reduce the inrush current and the energy wastage of the power supply.

DETAILED DESCRIPTION OF THE INVENTION

Figure 1:
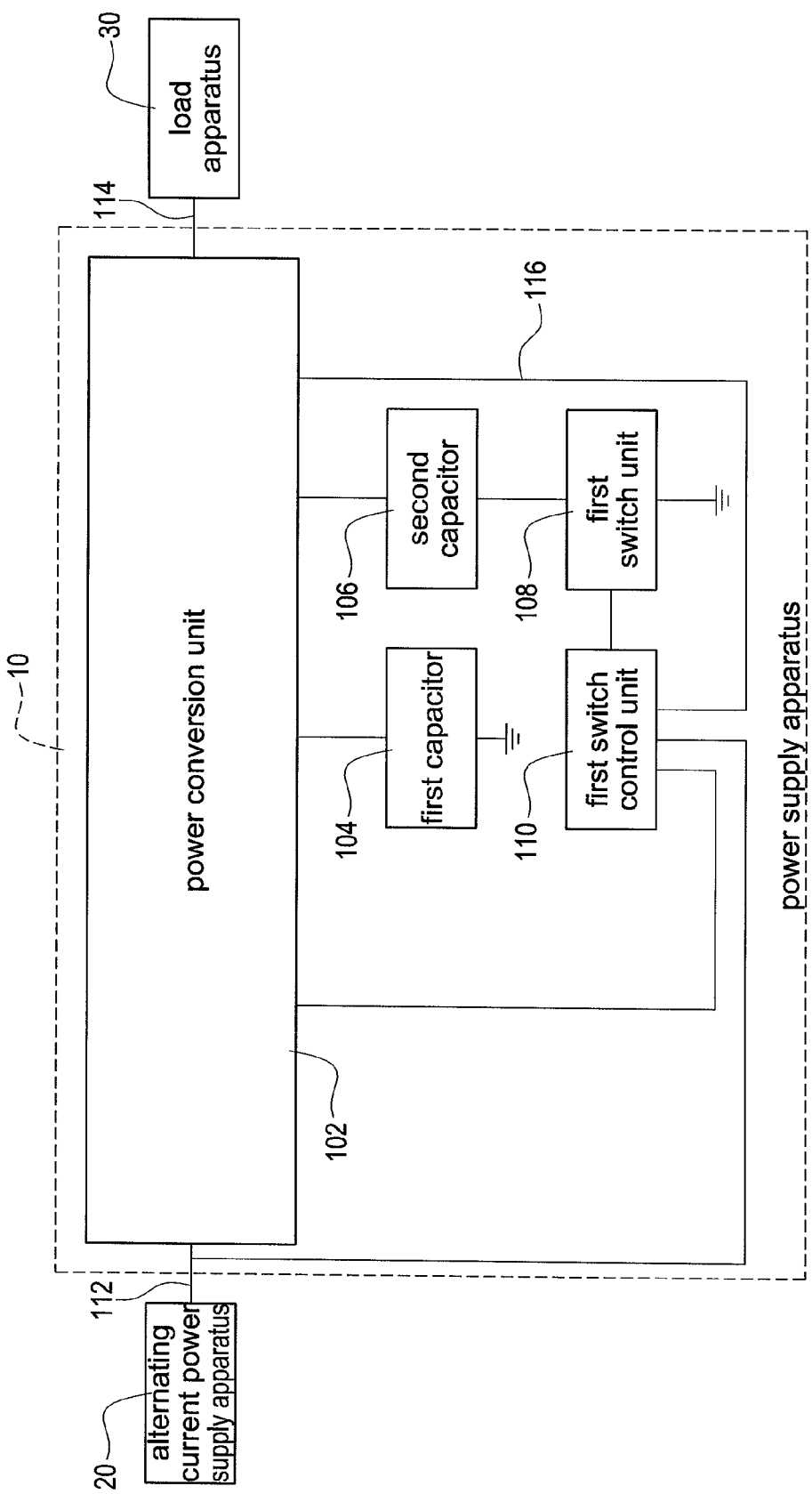
FIG. 1 shows a block diagram of the first embodiment of the power supply apparatus with variable circuit loop impedance of the present invention.

FIG. 1 shows a block diagram of the first embodiment of the power supply apparatus with variable circuit loop impedance of the present invention. A power supply apparatus 10 with variable circuit loop impedance is applied to an alternating current power supply apparatus 20 and a load apparatus 30. The power supply apparatus 10 includes a power conversion unit 102, a first capacitor 104, a second capacitor 106, a first switch unit 108 and a first switch control unit 110.

The power conversion unit 102 is electrically connected to the alternating current power supply apparatus 20 and the load apparatus 30. The first capacitor 104 is electrically connected to the power conversion unit 102. The second capacitor 106 is electrically connected to the power conversion unit 102 and the first capacitor 104. The first switch unit 108 is electrically connected to the second capacitor 106. The first switch control unit 110 is electrically connected to the first switch unit 108, the power conversion unit 102 and the alternating current power supply apparatus 20.

When the power conversion unit 102 is in a working mode, the power conversion unit 102 converts an alternating current power 112 from the alternating current power supply apparatus 20 into a direct current power 114. Then, the power conversion unit 102 sends a power starting signal 116 to the first switch control unit 110.

After the first switch control unit 110 receives the power starting signal 116, the first switch control unit 110 turns on the first switch unit 108, so that an overall capacitor impedance formed by the first capacitor 104 and the second capacitor 106 is smaller than a first capacitor impedance formed by the first capacitor 104.

When the power conversion unit 102 is not in the working mode, the first switch control unit 110 turns off the first switch unit 108, so that the overall capacitor impedance is equal to the first capacitor impedance.

In another word, the inrush current is generated easily when the power conversion unit 102 (or the alternating current power supply apparatus 20) is just started or the load apparatus 30 is just connected to the power conversion unit 102 (the power conversion unit 102 has not entered the working mode yet).

At this time, the first switch control unit 110 turns off (i.e. not turns on) the first switch unit 108, so that the overall capacitor impedance is equal to the first capacitor impedance. The first capacitor impedance is larger than the overall capacitor impedance formed by the first capacitor 104 and the second capacitor 106 when the first switch control unit 110 turns on the first switch unit 108. Therefore, the overall capacitor impedance is larger, so that the inrush current is suppressed.

Then, the power conversion unit 102 enters the working mode (no inrush current risk). The power conversion unit 102 sends the power starting signal 116 to the first switch control unit 110. The first switch control unit 110 turns on the first switch unit 108, so that the overall capacitor impedance formed by the first capacitor 104 and the second capacitor 106 is smaller than the first capacitor impedance formed by the first capacitor 104. Therefore, the overall capacitor impedance is smaller, so that the energy wastage is reduced.

Moreover, the power starting signal 116 can come from the alternating current power supply apparatus 20 or any other circuits as well although the power starting signal 116 comes from the power conversion unit 102 as shown in FIG. 1. In another word, the power starting signal 116 can come from:

1. The power supply signal (PSON) or the auxiliary power voltage signal (VAUX).
2. The high voltage signal (VHV).
3. The fire wire and the neutral wire voltage signal (LN).

Figure 2:
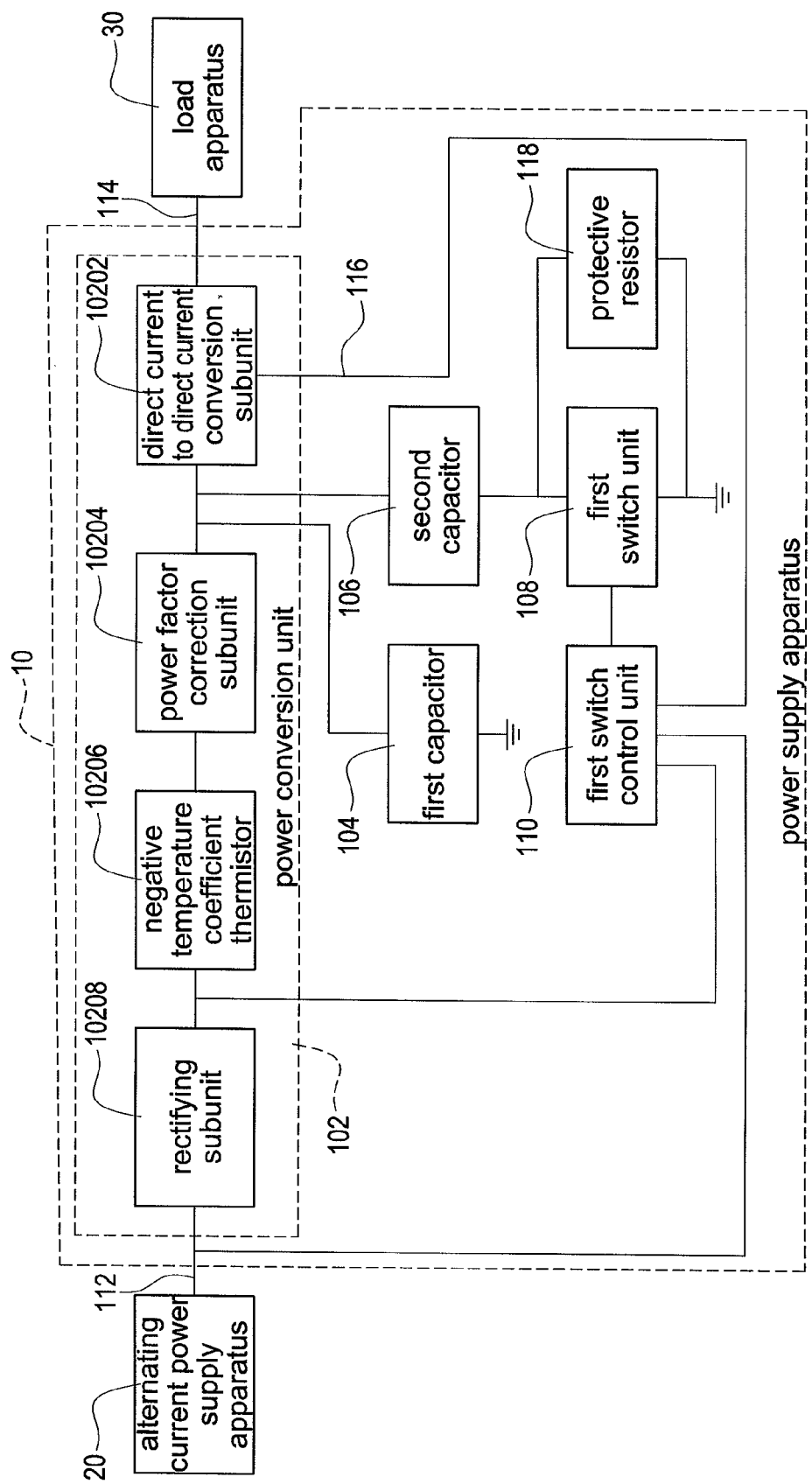
FIG. 2 shows a block diagram of the second embodiment of the power supply apparatus with variable circuit loop impedance of the present invention.

FIG. 2 shows a block diagram of the second embodiment of the power supply apparatus with variable circuit loop impedance of the present invention. A power supply apparatus 10 with variable circuit loop impedance is applied to an alternating current power supply apparatus 20 and a load apparatus 30. The power supply apparatus 10 includes a power conversion unit 102, a first capacitor 104, a second capacitor 106, a first switch unit 108, a first switch control unit 110 and a protective resistor 118.

The power conversion unit 102 includes a direct current to direct current conversion subunit 10202, a power factor correction subunit 10204, a negative temperature coefficient thermistor 10206 and a rectifying subunit 10208.

The power conversion unit 102 is electrically connected to the alternating current power supply apparatus 20 and the load apparatus 30. The first capacitor 104 is electrically connected to the power conversion unit 102. The second capacitor 106 is electrically connected to the power conversion unit 102 and the first capacitor 104. The first switch unit 108 is electrically connected to the second capacitor 106. The first switch control unit 110 is electrically connected to the first switch unit 108, the power conversion unit 102 and the alternating current power supply apparatus 20. The protective resistor 118 is electrically connected to the first switch unit 108 and the second capacitor 106.

The direct current to direct current conversion subunit 10202 is electrically connected to the load apparatus 30, the first switch control unit 110, the first capacitor 104 and the second capacitor 106. The power factor correction subunit 10204 is electrically connected to the first capacitor 104, the second capacitor 106 and the direct current to direct current conversion subunit 10202. The negative temperature coefficient thermistor 10206 is electrically connected to the power factor correction subunit 10204 and the first switch control unit 110. The rectifying subunit 10208 is electrically connected to the alternating current power supply apparatus 20, the negative temperature coefficient thermistor 10206 and the first switch control unit 110.

When the power conversion unit 102 is in a working mode, the power conversion unit 102 converts an alternating current power 112 from the alternating current power supply apparatus 20 into a direct current power 114. Then, the direct current to direct current conversion subunit 10202 of the power conversion unit 102 sends a power starting signal 116 to the first switch control unit 110.

After the first switch control unit 110 receives the power starting signal 116, the first switch control unit 110 turns on the first switch unit 108, so that an overall capacitor impedance formed by the first capacitor 104 and the second capacitor 106 is smaller than a first capacitor impedance formed by the first capacitor 104.

When the power conversion unit 102 is not in the working mode, the first switch control unit 110 turns off the first switch unit 108, so that the overall capacitor impedance is equal to the first capacitor impedance.

In another word, the inrush current is generated easily when the power conversion unit 102 (or the alternating current power supply apparatus 20) is just started or the load apparatus 30 is just connected to the power conversion unit 102 (the power conversion unit 102 has not entered the working mode yet).

At this time, the first switch control unit 110 turns off (i.e. not turns on) the first switch unit 108, so that the overall capacitor impedance is equal to the first capacitor impedance. The first capacitor impedance is larger than the overall capacitor impedance formed by the first capacitor 104 and the second capacitor 106 when the first switch control unit 110 turns on the first switch unit 108. Therefore, the overall capacitor impedance is larger, so that the inrush current is suppressed.

Then, the power conversion unit 102 enters the working mode (no inrush current risk). The power conversion unit 102 sends the power starting signal 116 to the first switch control unit 110. The first switch control unit 110 turns on the first switch unit 108, so that the overall capacitor impedance formed by the first capacitor 104 and the second capacitor 106 is smaller than the first capacitor impedance formed by the first capacitor 104. Therefore, the overall capacitor impedance is smaller, so that the energy wastage is reduced.

Moreover, the power starting signal 116 can come from the alternating current power supply apparatus 20 or any other circuits as well (for example, the rectifying subunit 10208) although the power starting signal 116 comes from the power conversion unit 102 as shown in FIG. 2. In another word, the power starting signal 116 can come from:

1. The power supply signal (PS_ON) or the auxiliary power voltage signal (VAUX).
2. The high voltage signal (VHV).
3. The fire wire and the neutral wire voltage signal (LN).

Moreover, the first switch unit 108 is, for example but not limited to, a transistor switch. The direct current to direct current conversion subunit 10202 is, for example but not limited to, a direct current to direct current converter. The power factor correction subunit 10204 is, for example but not limited to, a power factor correction circuit. The rectifying subunit 10208 is, for example but not limited to, a bridge rectifier. The first capacitor 104 is, for example but not limited to, an electrolytic capacitor. The second capacitor 106 is, for example but not limited to, an electrolytic capacitor. The protective resistor 118 is used to protect the first switch unit 108.

The advantage of the present invention is to reduce the inrush current and the energy wastage of the power supply. The resistance of the negative temperature coefficient thermistor 10206 can be smaller than the resistance of the negative temperature coefficient thermistor in the conventional power supply. Even the present invention does not need the negative temperature coefficient thermistor.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply apparatus with variable circuit loop impedance, the power supply apparatus applied to an alternating current power supply apparatus and a load apparatus, the power supply apparatus comprising:
   a power conversion unit electrically connected to the alternating current power supply apparatus and the load apparatus, the power conversion unit comprising a rectifying subunit and a direct current to direct current conversion subunit, the rectifying subunit electrically connected to the alternating current power supply apparatus and converting an alternating current power from the alternating current power supply apparatus into a direct current power, the direct current to direct current conversion subunit electrically connected to the rectifying subunit and the load apparatus;
   a first capacitor electrically connected to the rectifying subunit and the direct current to direct current conversion subunit;
   a second capacitor electrically connected to the rectifying subunit and the direct current to direct current conversion subunit, and electrically connected to the first capacitor in parallel;
   a first switch unit electrically connected to the second capacitor; and
   a first switch control unit electrically connected to the first switch unit, the power conversion unit and the alternating current power supply apparatus,
   wherein an inrush current is generated when the power conversion unit is just started or the load apparatus is just connected to the power conversion unit; the inrush current flows to the first capacitor through the rectifying subunit; the first switch control unit turns off the first switch unit, so that the inrush current is suppressed by the first capacitor,
   wherein when the inrush current is not generated and then the power conversion unit is in a working mode, the power conversion unit sends a power starting signal to the first switch control unit;
   after the first switch control unit receives the power starting signal, the first switch control unit turns on the first switch unit, so that the rectifying subunit outputs the direct current power to the first capacitor and the second capacitor, and an overall capacitor impedance formed by the first capacitor and the second capacitor is smaller than a first capacitor impedance formed by the first capacitor,
   wherein the power starting signal of the power conversion unit is generated from any connection point between the alternating current power supply apparatus and the direct current to direct current conversion subunit to be sent to the first switch control unit.

2. The power supply apparatus in claim 1, further comprising a protective resistor electrically connected to the first switch unit and the second capacitor.

3. The power supply apparatus in claim 2, wherein the power conversion unit further comprises:
   a power factor correction subunit electrically connected to the first capacitor, the second capacitor and the direct current to direct current conversion subunit.

4. The power supply apparatus in claim 3, wherein the power conversion unit further comprises:
   a negative temperature coefficient thermistor electrically connected to the power factor correction subunit and the first switch control unit.

5. The power supply apparatus in claim 4, wherein the first switch unit is a transistor switch.

6. The power supply apparatus in claim 5, wherein the direct current to direct current conversion subunit is a direct current to direct current converter.

7. The power supply apparatus in claim 6, wherein the power factor correction subunit is a power factor correction circuit.

8. The power supply apparatus in claim 7, wherein the rectifying subunit is a bridge rectifier.

* * * * *